April 16, 1935.  A. E. CARLISS  1,998,420
FLUID PRESSURE GAUGE
Original Filed July 14, 1932
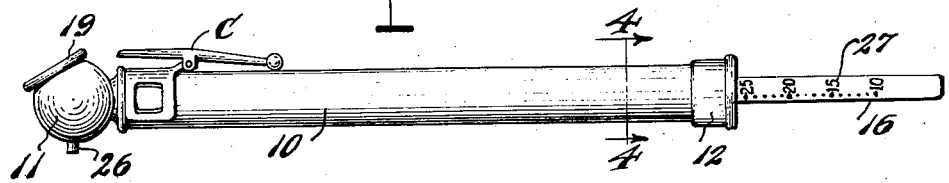
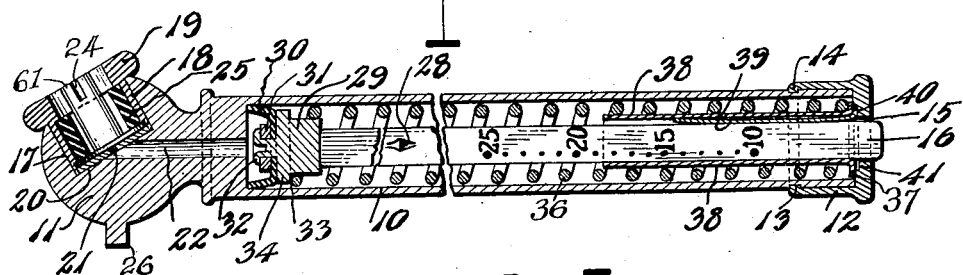
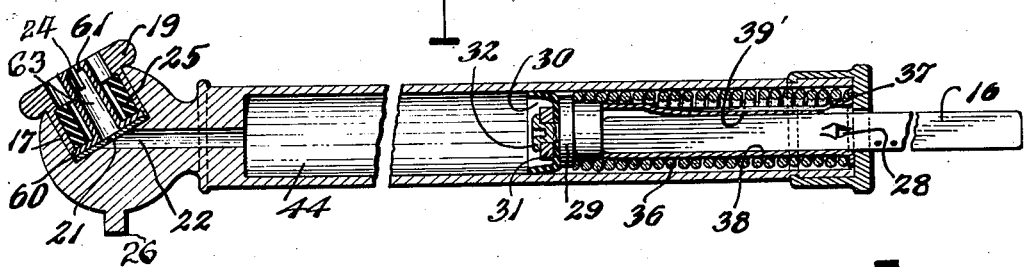
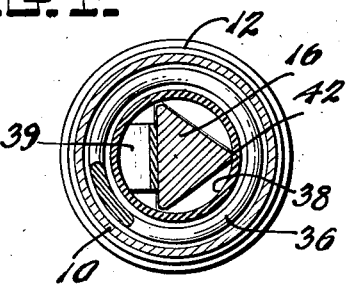
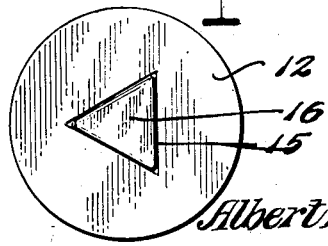
Inventor
Albert E. Carliss
By Edgar M Kitchin
His Attorney Patented Apr. 16, 1935

1,998,420

UNITED STATES PATENT OFFICE 1,998,420

FLUID PRESSURE GAUGE

Albert E. Carliss, Floral Park, N. Y., assignor to Acme Air Appliance Company, Inc., Brooklyn, N. Y., a corporation of New York Original application July 14, 1932, Serial No. 622,427. Divided and this application January 22, 1935, Serial No. 2,927

19 Claims. (Cl. 73—111)

This invention relates to fluid pressure gauges.

In a fluid pressure gauge constructed on the principle of having a graduated indicator bar moved outwardly of a cylinder by a plunger impelled against the tension of a helical, compression spring by the force of the fluid whose pressure is being read, the plunger and the spring being housed in the cylinder, the indicator bar should be stiff and rigid enough to withstand use and should be of such form that the markings or graduations thereon may be readable from substantially all points or angles of vision. Since the plunger is impelled by the fluid within the object whose pressure is to be determined, it is desirable to prevent a sudden inrush of fluid into the cylinder of the gauge which would otherwise tend to give a false indication. It is further essential to prevent any particles of foreign matter which might be commingled with the said fluid from clogging the fluid passages in the gauge which lead to the cylinder thereof. Also the free in-and-out movement of the indicator bar should be damped in order to give a smooth outward movement free from any erratic or jerking motion, and it is furthermore desirable to retain the indicator bar in the position in which it has been placed by the plunger after return of the plunger. Since the helical spring compresses as the plunger is being impelled, it is desirable to provide means for preventing possible disruption or distortion of the spring.

It is an object of this invention to provide a fluid pressure gauge with a stiff, rigid, graduated indicator bar of such form that the markings or graduations thereon may be read from substantially all points or angles of vision.

A further object of this invention resides in the provision of a fluid pressure gauge having a graduated indicator bar adapted to be moved outwardly of a cylinder by a plunger impelled by the force of the fluid whose pressure is being measured, and wherein means are provided to damp the free in-and-out movement of the indicator bar to give a smooth outward movement thereof and to retain the same in the position in which it is placed by the plunger.

A further object of the invention is to provide a fluid pressure gauge wherein a plunger housed within a cylinder is impelled therein acting against resilient resistance by the force of the fluid whose pressure is being read and wherein means are provided for preventing the plunger from further acting upon the resilient resisting means after the latter has been substantially completely compressed, thereby relieving it from likelihood of injurious stress.

A further object of the invention resides in providing, in a fluid pressure gauge having a plunger, within a cylinder, impelled by the force of the fluid whose pressure is being read, means to prevent the sudden inrush of the fluid into the cylinder and also to prevent any particles of foreign matter which might be in the fluid from clogging the passages through which the fluid must flow to get to the cylinder.

In a fluid pressure gauge embodying one specific set of details of the present invention, the fluid pressure to be gauged is caused to enter the indicator device through a small opening or fluid inlet in its head into a chamber from which it flows through a small perforation in a disc into another chamber or orifice leading to the cylinder of the device. The disc separates the two chambers and its perforation is preferably made larger in diameter than its length or depth so as to prevent any particles of foreign matter which might be commingled with the fluid from being lodged therewithin. The disc acts as a retarding member for the purposes of preventing a sudden inrush of fluid which would tend to give a false indication. Within the cylinder is a plunger upon which is seated a resilient cushion, preferably in the form of a helical, compression spring, confined within the cylinder. Arranged with its inner end in contact with but not fixed to the plunger is a graduated indicator bar which extends through the end of the cylinder opposite the head. The fluid under pressure, upon entering the cylinder, impinges upon the plunger and thereby urges the same outwardly against the tension of the spring, the plunger movement causing the indicator bar resting thereupon to be thrust longitudinally to a position projecting beyond the cylinder, the movement of the bar being proportional to the force of the pressure on the plunger. A friction device is provided within the cylinder to damp the free in-and-out movement of the indicator bar.

When the gauge is withdrawn from the object whose fluid pressure is being read, the expansion of the helical spring will return the plunger to its original, normal, at rest position, and the indicator bar will be retained by the same friction device in the outstanding position. The chambers or fluid passages separated by the perforated disc are made large enough to house or trap respectively any particles of foreign matter which may be commingled with the incoming fluid or the fluid expelled by the retracting plunger. The particles entering the comparatively large chambers will impinge against the walls formed by the disc, and will merely "dance" in the chambers and will not be forced through the small perforation in the disc. Provision is made for guiding the indicator bar or rod, and also for protecting the plunger-engaging spring from distortion, disruption, or other injury, as by introducing means to stop the further movement of the plunger when the spring reaches substantially the limit of its compressibility.

In order to provide an indicator bar or rod upon which the markings may be readable from all angles or points of vision and which is still and rigid enough to withstand use, the same is preferably made triangular in cross-section. An indicator bar or rod square in cross-section is next in preference, since such a bar is stiff and rigid and the markings thereon, can be read on four sides.

The invention will be understood from a consideration of the following detailed description taken in connection with the accompanying drawing forming a part of this specification, the drawing showing practical forms of the invention.

In the accompanying drawing,—

Figure 1 is a side elevation of an embodiment of the present invention.

Figure 2 is a longitudinal, central, sectional elevation thereof, the parts being seen on a somewhat enlarged scale relative to Figure 1.

Figure 3 is a similar view thereof including a modified embodiment of the friction device.

Figure 4 is a transverse section taken on the plane indicated by line 4—4 of Figure 1, the parts being seen on a scale somewhat enlarged over that of Figure 2.

Figure 5 is a view of the structure seen in Figure 1 looking at the end of the gauge bar, the parts being seen on the scale shown in Figure 4.

In the drawing, the number 10 indicates a tubular portion or cylindrical casing which is provided at one end with a deflating head 11 and a closing cap 12 at the other end. The cap 12 is preferably constructed with a projecting inner rim 13 fitting into a groove 14 of tube 10, thereby preventing cap 12 from being easily removed from tube 10 after being placed thereon. The cap 12 may be tight fittingly pressed on the tube or cylindrical casing 10 or may be made to turn in groove 14. Cap 12 has a triangularly-shaped opening 15 through which gauge or indicator bar 16 projects. Head 11 which is preferably made solid is provided with a recess or bore 17. At the bottom of recess 17, there is seated a disc 20 having a very small perforation or orifice 21 for the purposes herein stated. Located within the recess 17 is a deflator having a disc-shaped flanged portion 60 seated against the disc 20, and an upwardly-extending centrally-located shank 61. Formed in the shank 61 and flange 60 of the deflator is a central opening or fluid passage 63 which is in alinement with the perforation 21 of disc 20. The perforation in the disc 20 is preferably made larger in diameter than its length or depth and the fluid passage or chamber 63 is considerably larger in diameter than the diameter of the perforation in said disc. The shank 61 is provided at its top with a slotted opening or fluid inlet 24 which connects with the chamber 63. Surrounding the shank 61 is a gasket 25 preferably made of rubber. Tightly fitting within the recess 17 of head 11 and contacting with flange 60 of the deflator is a sleeve 18 having a flange 19 at its outer end abutting against the head 11 at its recessed portion. This sleeve holds the deflator in position against the disc 20.

Head 11 has a fluid passage or chamber 22, one outlet of which is in alinement with opening 21 in disc 20. This chamber 22 is considerably larger in diameter than the perforation or opening 21. From the above description, it is seen that the chambers 63 and 22 are separated by disc 20. The chamber 22 opens into the hollow space of cylindrical casing 10.

Head 11 on the side opposite recess 17 is provided with a projection 26 for engagement with the check valve of the pneumatic tire or other object whose pressure it may be desired to relieve.

Indicator bar 16 which is triangular in cross-section is provided with graduations 27 on all three sides. The end portion of gauge bar 16 nearest head 11 is provided with projections 28 to prevent indicator bar 16 from leaving the casing when in its extreme outer position. The projections 28, preferably one extending from each of two faces of bar 16, outstand sufficiently to engage cap 12 at the outer terminus of the travel of bar 16. As plainly seen in Figure 3, one side of bar 16 is left without a projection 28 so as to leave a smooth face for the engagement of the friction spring. Bar 16, at its inner end, rests freely against plunger 29, the latter having a cup washer 30 fastened to plunger 29 by means of washer 31 and upset portion 32 of plunger member 29. At 33 plunger 29 is reduced thereby forming collar 34, against which the inner end of the helical compression spring 36 rests. Spring 36 surrounds the guiding and stop sleeve 38, and at its outer end rests against collar 37 of sleeve 38, which collar in turn rests against cap 12. Sleeve 38 is longer than the space taken up by the spring 36, when the spring is completely compressed, so that in operation the sleeve prevents possible distortion, disruption or other injury of the spring, because the plunger 29 is stopped by contact with the inner end of sleeve 38 before the compression spring 36 reaches the full limit of its compressibility. Sleeve 38 thus provides a positive limit to the outward movement of plunger 29 under the impulse of pressure fluid.

In the embodiment seen in Figures 2 and 4, a flat leaf spring 39 having a lateral, terminal flange 40 at its outer end is arranged in sleeve 38, and the spring is slightly bowed to cause it to resiliently and frictionally engage one of the flat faces of bar 16. Flange 40 is seated in a circular recess 41 in said cap 12 so that the spring is free to move edgewise when bar 16 is turned on its major axis, the flange 40 travelling about the recess 41 during such movement. The purpose of spring 39 is to create and maintain a certain tension or friction on bar 16. This pressure of spring 39 against bar 16 causes enough friction to somewhat damp or retard the free longitudinal movement of bar 16, and thus prevents any sudden shifting or jerking movement of the bar, and also holds the bar at any outstanding position given to it by an outward movement of plunger 29 after the plunger has returned to its initial position. As best seen in Figure 4, spring member 39 in pressing against one of the flat surfaces of the triangular-shaped bar 16 forces the opposite edge 42 thereof against the inside surface of sleeve 38. The frictional resistance to longitudinal movement of the bar is equalized between the spring and the opposite edge so as to be non-varying and insure uniformly accurate reading of the indicated pressure.

Figure 3 shows a modification insofar as spring 39 is concerned. This modification consists of spring 39' being formed out of the tubing 38 and left integral therewith at one end of the spring.

The operation of the device is as follows:

The deflator 61 of the air chuck or head 11 is pressed against the check valve of the pneumatic tire or other object, the pressure of whose contained pressure fluid is to be determined. As will be apparent, contact of the valve stem of the pneumatic tire against the outer end of the gasket 25 provides a non-leaking joint and prevents escape of compressed air except through slot 24. The air from such tire enters through slot 24 into chamber 44 of housing 10. On account of the very small orifice 21 in the disc 20 this entrance of the compressed fluid from the tire will be retarded sufficiently to prevent a jerking operation of the plunger 29 and indicator bar 16. This fluid pressure forces plunger 29 outwardly against the tension of helical spring 36 and the plunger moves the indicator bar to indicating position. The compressibility of helical spring 36 under various pressures has been predetermined and can therefore be readily read from graduations 27 on gauge member 16. After air chuck 11 is removed from the valve stem, helical spring 36 forces plunger 29 back into its normal, at rest position, and the friction spring, either 39 or 39', retains bar 16 in the outstanding, indicating position. After reading the innermost graduation of bar 16 exposed beyond cap 12 as the indicated pressure, the operator merely usually pushes bar 16 back until it again rests against plunger 29, and the gauge is then ready for another operation.

Bar 16 is prevented from leaving housing 10 by projections 28 outstanding one from each of two faces of the bar 16 far enough to contact with cap 12 when the bar is in extreme outward position. An additional benefit derived from the length of sleeve 38 and flat spring 39 or 39' pressing against gauge member 16 thereby forcing edge 42 against the inside of tube 38, is the smooth riding obtained, that is the non-jerking longitudinal movement of bar 16 under thrust from plunger 29.

The device may be supplied with a spring clip or clamp C to facilitate its being carried on the person in a pocket similar to a pencil or fountain pen.

This application is a division of my co-pending application Serial No. 622,427, filed July 14, 1932.

The disc 20 with its orifice 21 and the combination involving the same; the combination involving the projections 28 and their relative location, and also the combination involving the proportions of the parts whereby the spring 36 is safe-guarded against injury from an over-thrust of plunger 29 are made the subject matter of claim in my said co-pending application and are accordingly not claimed herein.

What is claimed is:

1. In pressure fluid gauges, the combination of a tubular member, a gauge bar reciprocally mounted therein and polysided and having a longitudinal angle, and means resiliently stressing said bar and causing said angle to be pressed into edge line contact with a portion of the tubular member for a substantial portion of the length of the bar and to thereby frictionally resist movement of the bar.

2. The combination as claimed in claim 1 wherein the said bar is triangular in cross section.

3. The combination as claimed in claim 1 wherein the resilient stressing means is a leaf spring.

4. The combination as claimed in claim 1 wherein the resilient stressing means is a leaf spring bowed to engage a portion of the tubular member at one side and a flat face of the bar at the other.

5. The combination as claimed in claim 1 wherein the resilient stressing means is a leaf spring extending for a substantial length of and in resiliently stressed contact with a flat face of the gauge bar, and means for detachably retaining the spring in place.

6. In pressure fluid gauges, the combination, with a housing, of a polysided gauge bar reciprocally mounted therein to move beyond the housing, the housing having an opening through which the bar is free to move, which opening corresponds in contour substantially to the cross section of the bar, and means engaging a face of the bar and resiliently stressing the same to a position with one of the longitudinal edges of the bar in frictional contact with a relatively stationary portion, the said contacting edge being straight and smooth throughout those portions adapted to engage said relatively stationary portion during movement of the bar.

7. In pressure fluid gauges, the combination of a tubular guide, a gauge bar reciprocally mounted therein and having a longitudinal, smooth, straight edge, and resilient stressing means engaging the bar and stressing the bar bodily laterally and thereby effecting frictional action of said edge to damp movements of the bar and hold the bar in outstanding positions.

8. In pressure fluid gauges, the combination, with a housing, of a gauge bar mounted therein and arranged to reciprocate through one end thereof and adapted to turn on its longitudinal axis, the housing having an annular recess, a spring frictionally engaging a portion of the bar and having a flange outstanding therefrom seated in said annular recess for allowing longitudinal movement of the bar while damping such movement, and means for retaining the spring against longitudinal movement and leaving the spring free to revolve with the bar when the bar is turned on its longitudinal axis.

9. The combination as claimed in claim 8 wherein the spring is of the leaf type.

10. The combination as claimed in claim 8 wherein the spring is of the leaf type and has a terminal flange seated in the annular recess of the housing.

11. The combination as claimed in claim 8 with a sleeve arranged in and carried by the housing at the end thereof through which the bar extends and the spring is located within said sleeve.

12. A pocket tire-gauge, comprising, a tubular barrel equipped at one end with an apertured head for engagement with the mouth of a tire-valve-stem and at the other end with an apertured cap, a piston in said barrel toward said head-end thereof, a sleeve in the other end of the barrel, said sleeve being outwardly flanged at the end thereof adjacent said cap, a spiral spring located in the barrel under compression between said piston and sleeve, said spring surrounding the sleeve and bearing against its aforesaid flange, a graduated indicating rod located within said spiral spring and within said sleeve and resting at one end on the piston and having its other end projecting through the apertured cap; and a leaf spring within said sleeve bearing against the side of the indicating rod and having a laterally directed lug at one end located between the flange of the sleeve and the aforesaid cap.

13. In pressure fluid gauges, the combination, with a tubular member, of a polysided gauge bar extending into the tubular member and mounted to reciprocate through one end thereof, pressure responsive means for actuating the bar, said tubular member having a transversely curved longitudinal portion lying along a longitudinal edge of the bar, and means resiliently stressing said bar to contact of said edge with said curved portion.

14. In pressure fluid gauges, the combination, with a housing, of a polysided gauge bar arranged therein to reciprocate through one end thereof, pressure responsive means within the housing for actuating the bar, and a guiding sleeve within the housing surrounding the bar and having a portion of the material of the sleeve severed and sprung inward to frictional engagement with the bar for resiliently stressing the bar.

15. In pressure fluid gauges, the combination of a tubular member, an elongated gauge member reciprocally mounted therein, one of said members having a longitudinal angle providing an edge line contact between the two members, and means resiliently maintaining said edge line contact for providing frictional resistance to longitudinal movement of the gauge member relative to the tubular member.

16. The combination as claimed in claim 15 wherein the resilient means is a spring located at a diametrically opposite side of the gauge member from that of the line contact.

17. The combination as claimed in claim 15 wherein the resilient means comprises a leaf spring extending along the gauge member at a place in the length of the gauge member diametrically opposite the place of the line contact and stressing the gauge member laterally into such contact.

18. In fluid pressure gauges, the combination, with a housing, of a gauge bar reciprocally mounted therein and adapted to have portions of the bar moved through and beyond the housing proportional to pressure being measured, and a leaf spring within the housing extending lengthwise of the gauge bar to resiliently stress the same to frictionally retain the bar against accidental movement, said housing having a channel, and the spring having a terminal flange anchored in said channel.

19. In fluid pressure gauges, the combination, with a housing, of a polysided gauge bar mounted therein and arranged to reciprocate through one end thereof, a leaf spring extending lengthwise of the gauge bar and having a face resting under spring tension against a side of the bar, the spring having a laterally extending flange, and means of detachable engagement for said flange for retaining the spring against longitudinal movement while leaving the bar free to reciprocate longitudinally against the frictional resistance of the spring contact.

ALBERT E. CARLISS.